UNITED STATES PATENT OFFICE.

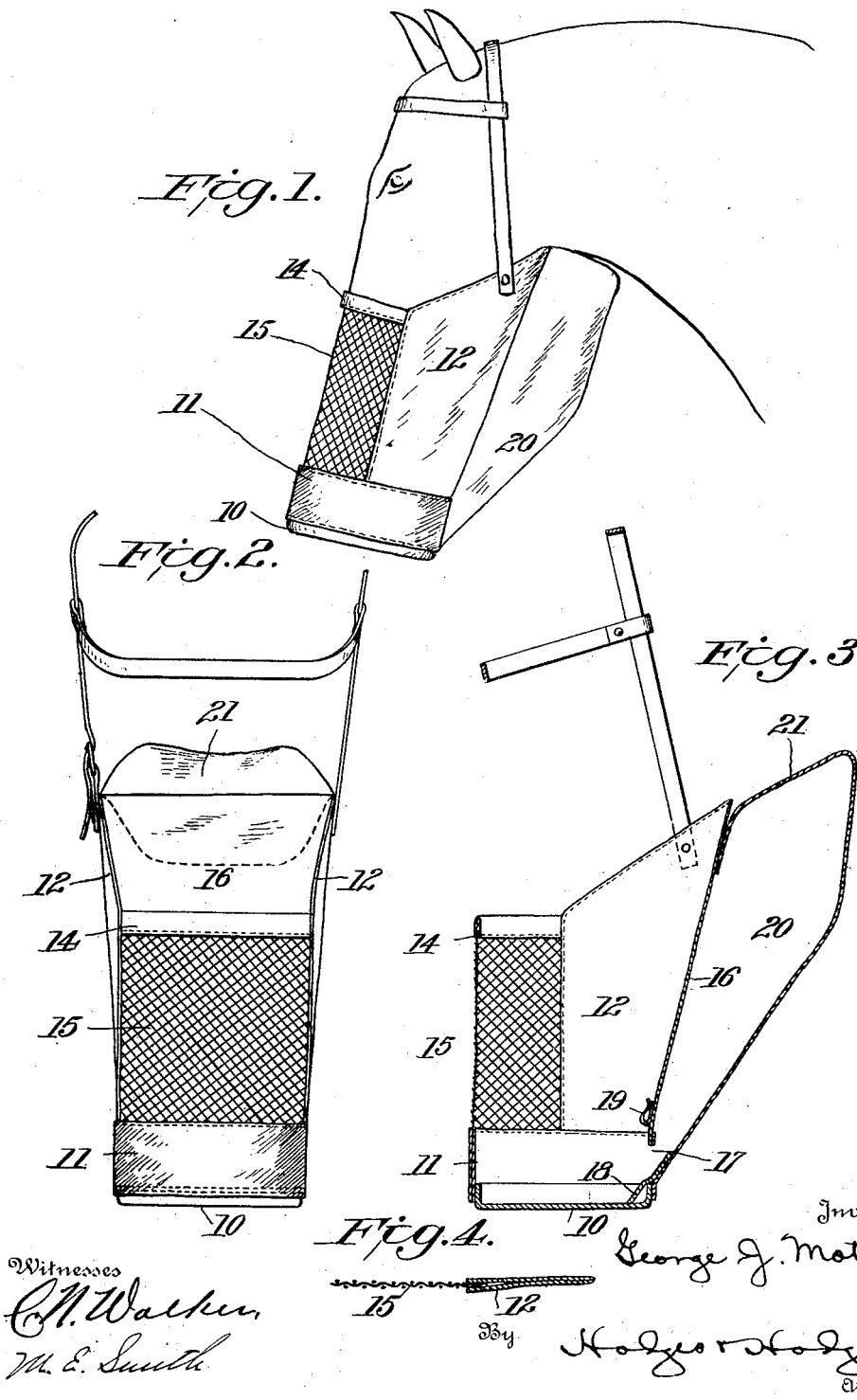

GEORGE J. MOTTER, OF WASHINGTON, DISTRICT OF COLUMBIA.

NOSE-BAG.

1,109,135.   Specification of Letters Patent.   Patented Sept. 1, 1914.

Application filed February 27, 1914.  Serial No. 821,475.

*To all whom it may concern:*

Be it known that I, GEORGE J. MOTTER, a citizen of the United States, residing at Washington, in the District of Columbia, have invented new and useful Improvements in Nose-Bags, of which the following is a specification.

This invention relates to an improved nose bag of the type employed for feeding animals.

In nose bags of the type now in general use practically no provision is made for ventilation, and as a consequence when bag is placed in position over the nose and mouth of the animal, the latter is stifled because of the lack of air and because the chaff and other impurities in the feed enter the nostrils, and interfere with breathing.

One of the important objects of the present invention is to produce a nose bag which will permit the animal freedom in breathing, and to avoid all tendency of the chaff and other impurities entering the nostrils. Attemps have been made heretofore to provide ventilation in nose bags, but in such instances a wire screen has been employed to provide the necessary inlet for the air. Such screens are open to several objections, among them being that the animal in swinging its head is apt to bring the screen into contact with some hard surface, and thereby break the screen and force the sharp ends thereof into its flesh. Another objection is that the moisture which accumulates from the blowing of the animal during feeding gathers on the screen, whereupon dust, chaff and the like adhere to the screen and impede the entrance of the air. This objecttion is overcome in the present invention by making the ventilating opening sufficiently large to provide for the ingress of amply sufficient air, and by covering the same with a meshed fabric, the mesh being sufficiently small to prevent the feed from falling through the same, but sufficiently large to prevent choking in the manner above described.

A further object of the invention is to provide a feed bag in which the feed is supplied to the animal as fast as consumed.

A further object is to provide a nosebag of this character in which the desired feed may be carried therein ready for use at any time.

The invention will be hereinafter fully set forth and particularly pointed out in the claims.

In the accompanying drawings:—Figure 1 is side elevation illustrating my improved nose bag. Fig. 2 is a front view thereof. Fig. 3 is a longitudinal sectional view. Fig. 4 is a detail.

Referring to the drawing, 10 designates the bottom of my improved nose bag, the same being formed of leather or other suitable material, and preferably circular in plan view, and leading upwardly from said bottom or base is a cylindrical feed receptacle, formed of flexible material, preferably canvas, as indicated at 11. Extending upwardly from the cylindrical wall of the receptacle 11, and secured to the upper edge of said wall, are spaced apart side pieces 12, the top edges of said side pieces being inclined downwardly from the rear to the front in order to pass below the eyes of the animal. The upper forward edges of the side pieces 12 are united by a strap 14, leaving an open space between the bottom edge of said strap, the forward edges of said side pieces, and the top edges of the feed receptacle 11. It will be observed that this opening, which I will term a ventilating opening, is relatively large, and the same is covered by a suitable open meshed fabric 15, the edges of which are bound in between the double facings of which the feed receptacle, the sides and the strap are made. By this arrangement the parts present a neat appearance and the animal is protected from injury from projecting knots and strands.

The rear of the bag is in the form of a chute, one wall 16 of which is secured to the rear edges of the side pieces and to the upper edge of the receptacle 11, thereby forming the rear or back wall of the bag, this wall 16 being of sufficient length to extend close up to the neck of the animal. In the construction illustrated in the drawing, an opening 17 is provided between the bottom edge of the wall 16 and the upper edge of the receptacle 11, which opening may be closed by a flap 18, provided with a button hole or eye to engage a suitable fastening device 19. To the wall 16 is secured the chute portion 20, coöperating with the wall 16 to form an approximately cylindrical chute leading to the opening 17, and provided at its top with an extension or flap 21.

In practice, the feed is placed within the chute portion 20, the flap 21 being closed inwardly over the top. The nose bag may then be placed upon the animal, being supported in position by the usual straps passed over the head. When in position on the animal the flap 21 is held over the feed by the neck of the animal, and the head of the animal completely fills the nose bag. Thus the feed cannot be thrown out over the edges of strap 14 and side pieces 12, should the animal toss its head, or otherwise move the nose bag. The opening 17 is sufficiently high to insure that the feed will pass downwardly through the opening into the receptacle 11, where it can be readily taken up by the animal, the supply of feed flowing out of the chute being regulated by the consumption of feed by the animal. The ventilating opening comes opposite the nostrils of the animal, but sufficiently high to prevent the feed from falling out, thereby permitting the animal to breathe freely. The textile fabric mesh 15 will prevent the feed from being blown out by the animal, and at the same time it is of such a nature that the dust and chaff will not adhere thereto and choke off the ventilation. Furthermore, if the animal, in swinging its head, should bring the feed bag into contact with any hard object, no injury will result for the reason that the fabric can conform to the shape that the bag assumes, and only a smooth unbroken surface comes in contact with the animal. When it is desired to transport feed that is not to be used immediately, the flap 18 is closed and the chute portion filled with the feed as above described. The flap 21 is then folded over, and the nose bag may then be rolled up or folded to any suitable or desired shape for transportation, and readily opened when desired for use.

Having thus explained the nature of my invention and described an operative manner of constructing and using the same, although without attempting to set forth all of the forms in which it may be made, or all of the forms of its use, what I claim is:—

1. A nose bag comprising a base, a feed receptacle comprising a cylindrical wall secured at its lower edge to said base, spaced apart side pieces having their lower edges secured to the top edge of said cylindrical wall, the upper edges of said pieces being inclined upwardly from front to rear to fit closely around the jaw of the animal, a rear wall uniting the rear edges of the side pieces back of the jaw of the animal, a head strap secured to the tops of the side pieces near the rear edges thereof, a strap joining the forward edges of said side pieces where the front and top edges of said pieces meet, said straps being arranged to fit closely around the nose of the animal, and coöperating with the head strap to prevent swinging movement of the nose bag, a rectangular front opening being formed between said strap and said cylindrical wall and the forward edges of said side pieces, and an open mesh fabric of textile material covering said rectangular opening.

2. A nose bag comprising a base, a feed receptacle comprising a cylindrical wall secured at its lower edge to said base, spaced apart side pieces having their lower edges secured to the top edge of said cylindrical wall, the upper edges of said pieces being inclined upwardly from front to rear to fit closely around the jaw of the animal, a chute forming the rear wall of the nose bag and connecting the rear edges of the side pieces back of the jaw of the animal, said chute having an opening leading into said receptacle, a flexible closure for said opening, a head strap secured to the tops of the side pieces near the rear edges thereof, a strap joining the forward edges of said side pieces where the front and top edges of said pieces meet, said strap being arranged to fit closely around the nose of the animal, and coöperating with the head strap to prevent swinging movement of the nose bag, a rectangular front opening being formed between said strap and said cylindrical wall and the forward edges of said side pieces, and an open mesh fabric of textile material covering said rectangular opening.

In testimony whereof I have hereunto set my hand in presence of two subscribing witnesses.

GEORGE J. MOTTER.

Witnesses:
M. A. BECKHAM,
RAYMOND OCKERSHAUSEN.

Copies of this patent may be obtained for five cents each, by addressing the "Commissioner of Patents, Washington, D. C."